US007805840B2

(12) United States Patent
Bingham et al.

(10) Patent No.: US 7,805,840 B2
(45) Date of Patent: Oct. 5, 2010

(54) METHOD OF MANUFACTURE OF AN AUTOMOBILE STRUCTURE AND AN AUTOMOBILE STRUCTURE MADE BY THE METHOD

(75) Inventors: John Kenneth Bingham, Wymondham (GB); Robert McQuire, Norfolk (GB); John Nicholas Sampson, Atleborough (GB)

(73) Assignee: Lotus Cars Limited, Norfolk (GB)

( * ) Notice: Subject to any disclaimer, the term of this patent is extended or adjusted under 35 U.S.C. 154(b) by 1379 days.

(21) Appl. No.: 10/509,568

(22) PCT Filed: Apr. 7, 2003
(Under 37 CFR 1.47)

(86) PCT No.: PCT/GB03/01535
§ 371 (c)(1),
(2), (4) Date: Oct. 26, 2005

(87) PCT Pub. No.: WO03/086840
PCT Pub. Date: Oct. 23, 2003

(65) Prior Publication Data
US 2006/0097502 A1    May 11, 2006

(30) Foreign Application Priority Data
Apr. 5, 2002    (GB) .................................. 0207922.6

(51) Int. Cl.
*B21D 53/88* (2006.01)
(52) U.S. Cl. ..................... 29/897.2; 29/527.6; 280/781; 280/785; 180/311; 296/204
(58) Field of Classification Search ................ 29/897.2, 29/458, 469, 525.01, 527.2, 527.5, 527.6, 29/557, 558; 280/781, 785; 180/311; 296/204
See application file for complete search history.

(56) References Cited

U.S. PATENT DOCUMENTS 3,685,854 A    8/1972    Cadiou (Continued)

FOREIGN PATENT DOCUMENTS

EP    0 146 716 A2    10/1984

(Continued)

OTHER PUBLICATIONS

The UK Patent Office, "Patents Act 1977 Search Report Under Section 17" documents considered to be relevant, Jul. 22, 2002, Great Britain.

(Continued)

*Primary Examiner*—David P Bryant
*Assistant Examiner*—Ryan J Walters
(74) *Attorney, Agent, or Firm*—Luedeka, Neely & Graham, PC (57) ABSTRACT

With reference to FIG. 1, the present invention provides a method of manufacture of an automobile structure comprising the steps of: forming in a die a plurality of castings (10) each having at least one socket (14); forming a plurality of metallic rails (12, 13) and fixing the metallic rails (13, 14) in the socket of the castings (10) in order to construct the automobile structure. The present invention also provides a method of manufacture of a plurality of different automobile structures, the method comprising: fixing metallic rails of a first plurality into sockets of a first plurality of the castings to form a first type of automobile structure; and fixing metallic rails of a second plurality into sockets of a second plurality of castings to form a second type of automobile structure. The invention also relates to automobile structures made by the methods.

29 Claims, 9 Drawing Sheets

U.S. PATENT DOCUMENTS

| | | | |
|---|---|---|---|
| 4,618,163 A | | 10/1986 | Hasler et al. |
| 5,085,485 A | | 2/1992 | Wurl |
| 5,112,102 A | | 5/1992 | Wurl |
| 5,482,323 A | * | 1/1996 | Hicks .......................... 280/785 |
| 5,716,155 A | | 2/1998 | Yoshida et al. |
| 5,947,519 A | * | 9/1999 | Aloe et al. .................. 280/785 |
| 6,193,273 B1 | | 2/2001 | Novak et al. |
| 6,293,618 B1 | | 9/2001 | Sukegawa et al. |
| 7,322,106 B2 | * | 1/2008 | Marando et al. ........... 29/897.2 |

FOREIGN PATENT DOCUMENTS

| | | |
|---|---|---|
| EP | 0 900 716 A1 | 8/1998 |
| EP | 0 900 716 A1 | 3/1999 |
| GB | 312720 | 6/1929 |
| GB | 2079226 | 1/1982 |

OTHER PUBLICATIONS

The UK Patent Office, "Patents Act 1977 Search Report Under Section 17" documents considered to be relevant, Jul. 4, 2003, Great Britain.

International Preliminary Examination Reports citing the above references (2 pages).

* cited by examiner

METHOD OF MANUFACTURE OF AN AUTOMOBILE STRUCTURE AND AN AUTOMOBILE STRUCTURE MADE BY THE METHOD

The present invention relates to a method of manufacture of an automobile structure and to an automobile with a structure made by the method.

Automobile structures such as rolling chassis, chassis tubs and other types of platform have traditionally been constructed by methods which make variations very difficult. Different automobiles may share a common platform, but the platform itself is of a fixed shape and configuration. Whilst this has suited the needs of mass automobile manufacture the known methods are not ideal for low volume manufacturers because of their inflexibility.

The present invention provides in a first aspect a method of manufacture of an automobile structure comprising the steps of:

forming in a die a plurality of castings each having at least one socket;

forming a plurality of metallic rails; and fixing the metallic rails in the sockets of the castings in order to construct the automobile structure.

The present invention provides in a second aspect a method of manufacture of a plurality of different automobile structures comprising:

forming in a die a plurality of identical castings each having at least one socket;

forming a first length of metal of a first chosen cross-section;

cutting the first length of metal into a first plurality of side rails for an automobile each with the same first side rail length;

cutting the first length of metal into a second plurality of side rails for an automobile each with the same second side rail length different to the first side rail length;

fixing the metallic rails of the first plurality into sockets of a first plurality of the castings to form a first type of automobile structure; and fixing the metallic rails of the second plurality into sockets of a second plurality of castings to form a second type of automobile structure.

A preferred method of manufacture of an automobile structure will now be described with reference to the accompanying drawings which show component parts used in the method as follows.

Figure 1:
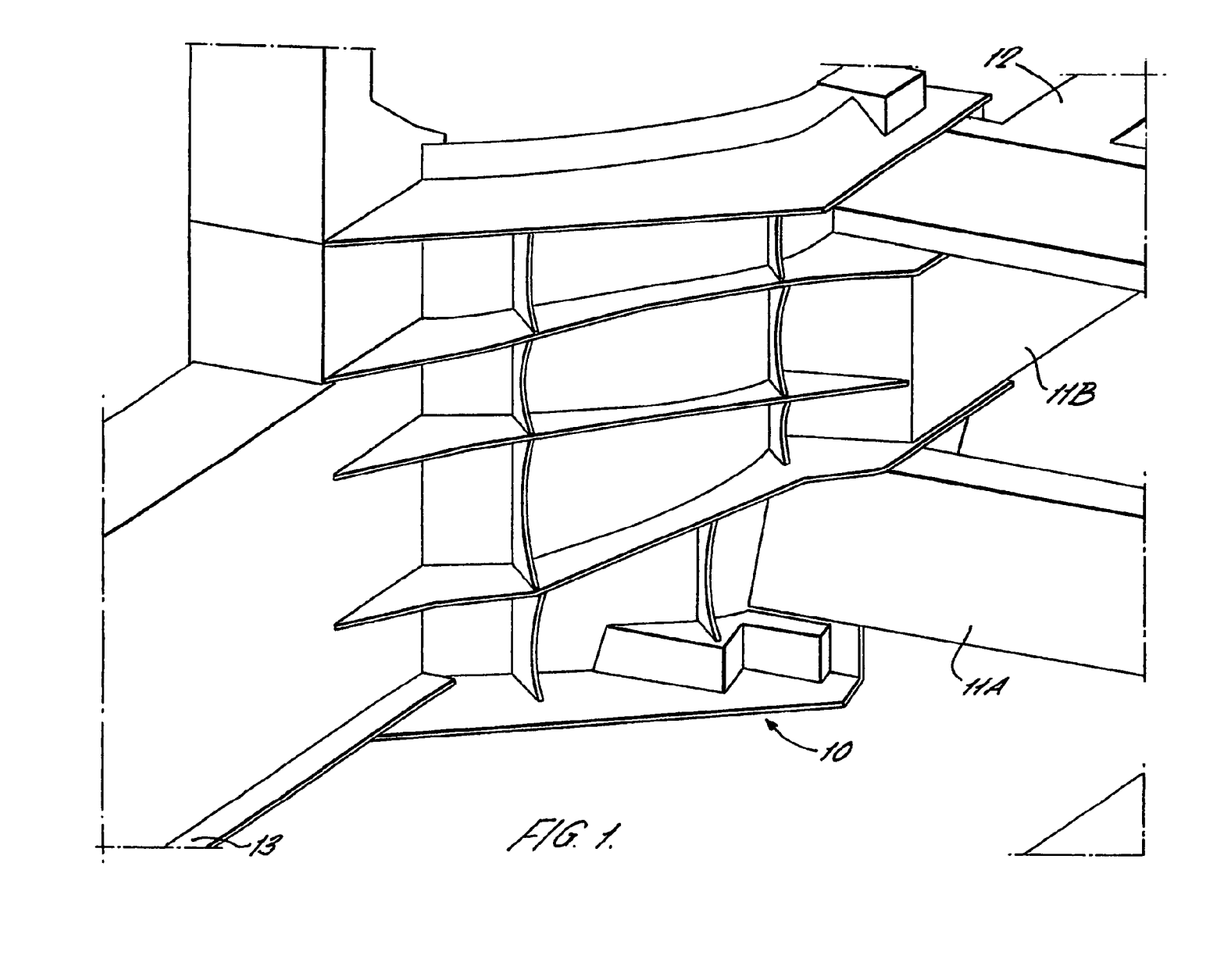
FIG. 1 shows a first assembled joint of an automobile structure according to a method of the present invention.

Turning first to FIG. 1 there can be seen a casting 10 to which are joined a front bulkhead of a vehicle (comprising a transverse rail 11A and transversely extending support structure 11B), a side rail 12 and a side rail 13. The transverse rail 11A and the side rails 12 and 13 are extrusions, typically of an aluminium alloy. The side rail 12 extends rearwardly of the first bulkhead to join the casting 10 to another similar casting (not shown) to which is attached a rear bulkhead (not shown, but similar to the front bulkhead 11A and 11B). The side rail 13 extends forwardly of the first bulkhead to provide support for an engine (on a front-engined vehicle), the crash structure of the vehicle (not shown) and one of the front suspension assemblies of the vehicle (not shown). The side rails 12, 13 and the transverse rail 11A are all bonded to the casting 10.

Figure 2:
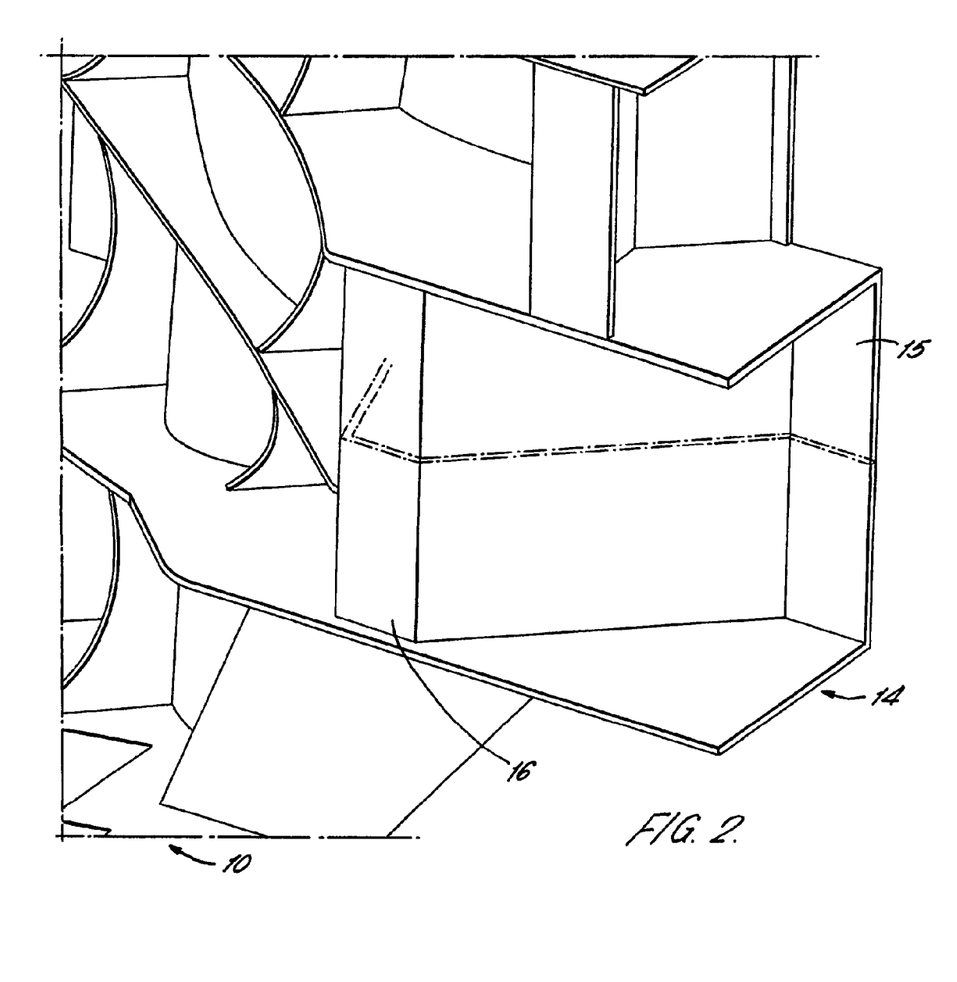
FIG. 2 is a first detail view of a part of the joint illustrated in FIG. 1.
Figure 3:
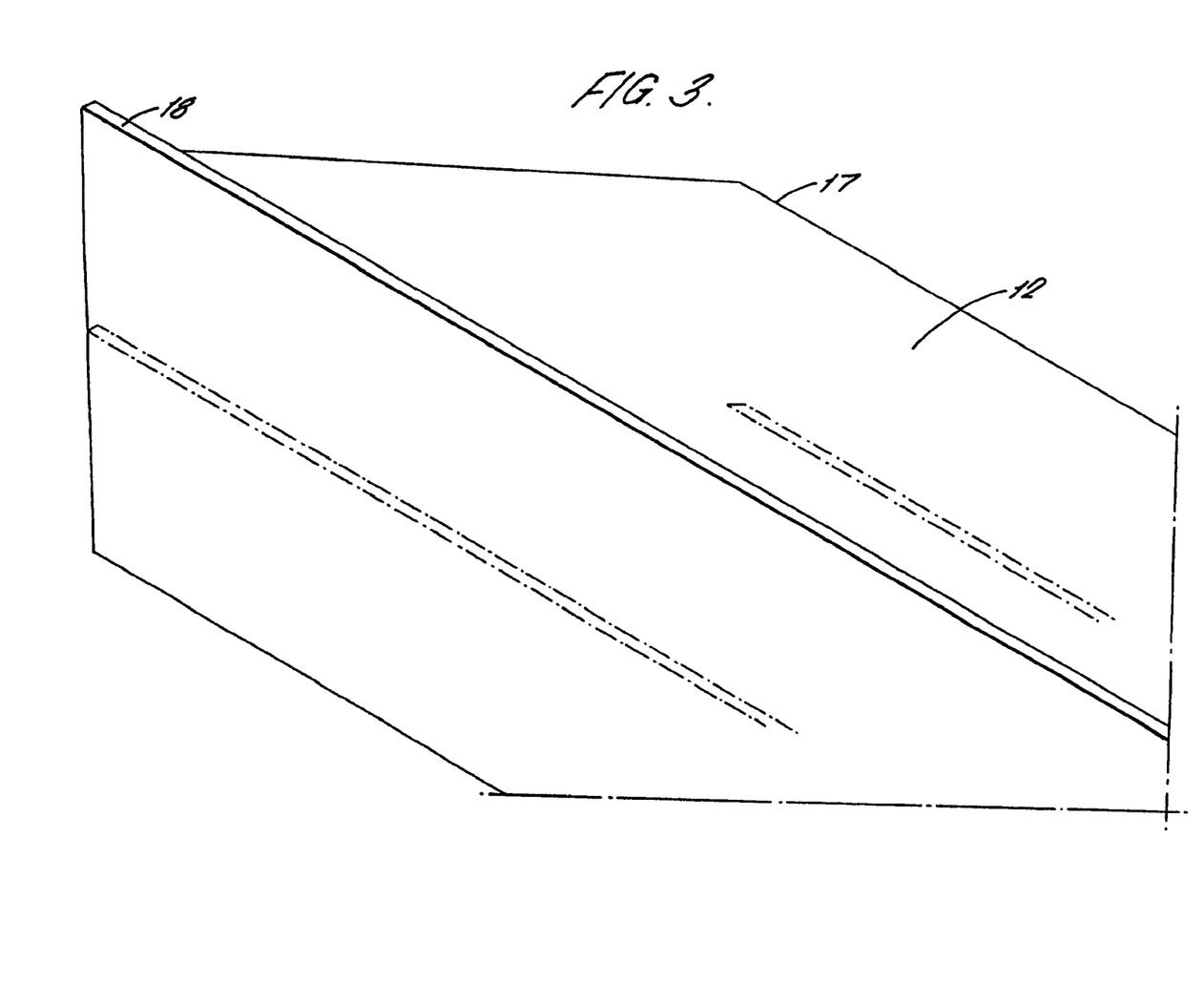
FIG. 3 is a second detail view of a part of the FIG. 1 joint.

FIG. 2 shows in detail a part of the casting 10. The casting 10 has as an integral feature a socket 14 open in two perpendicular directions having a pair of parallel spaced apart planar surfaces 15 and 16. The side rail 12 is a box section extrusion (see FIG. 3). The front end of the side rail is cut at an angle to leave a pair of parallel spaced apart planar surfaces 17 and 18. The planar surface 18 is formed from part of a surface which was initially an interior surface of the box section extrusion, prior to cutting of the extrusion.

Figure 4:
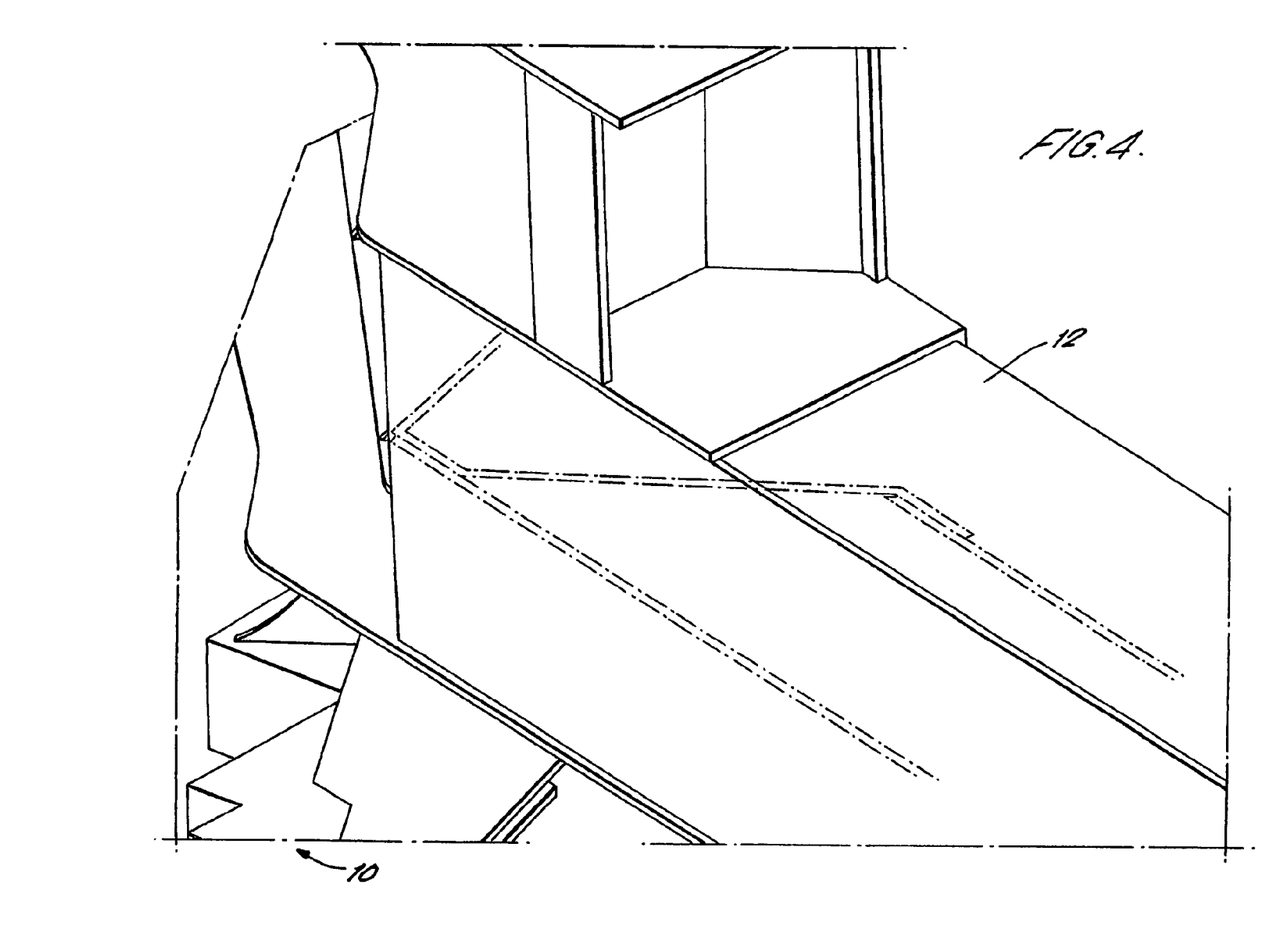
FIG. 4 is a third detail view of the joint of FIG. 1.

The planar surfaces 17 and 18 are respectively adhered to the planar surfaces 15 and 16 of the open socket 14. The resulting joint can be seen in FIG. 4. A cover (not shown) will be fixed across the joint to close the socket in one direction.

Figure 5:
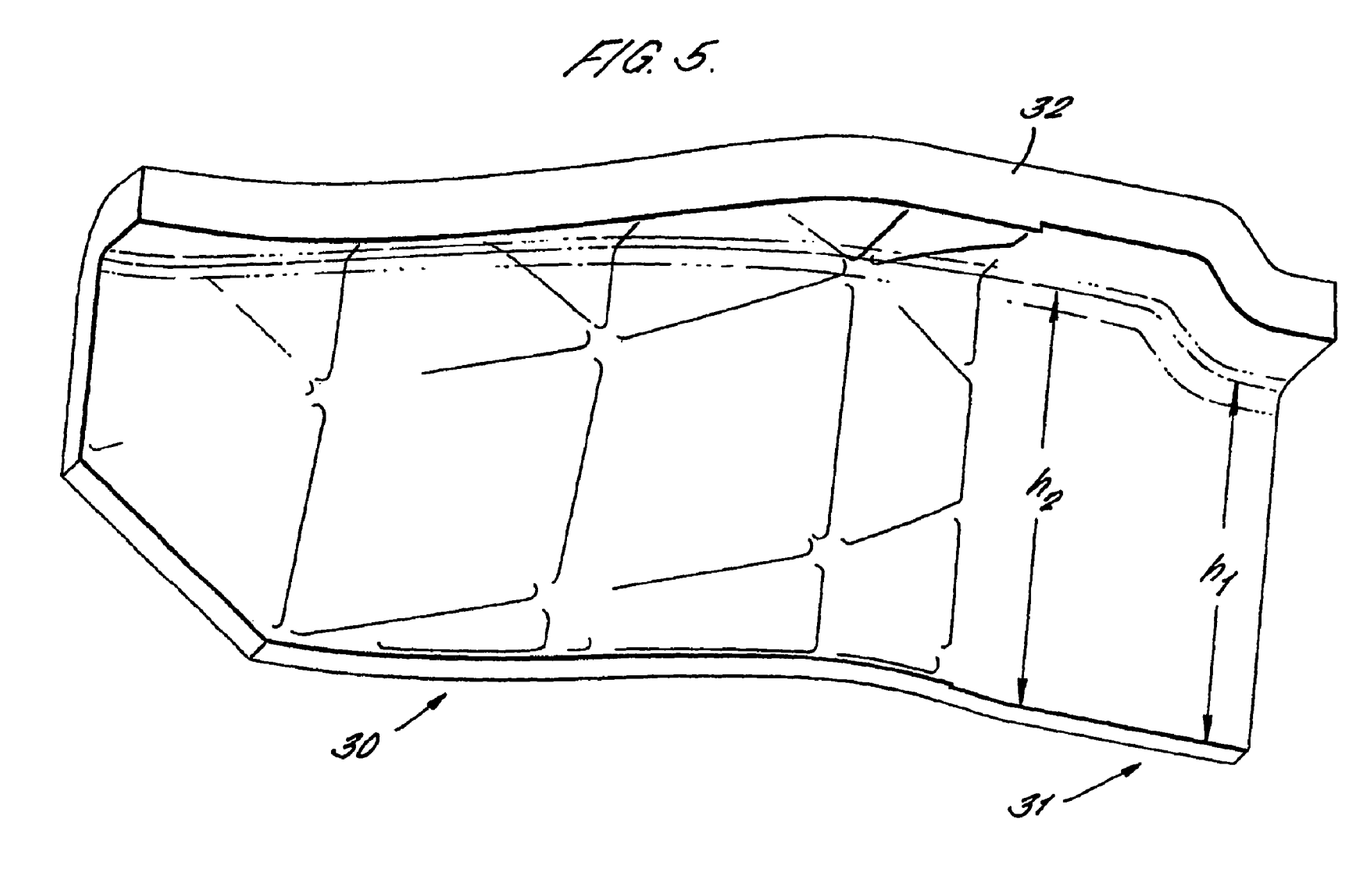
FIG. 5 is a first view of a structural member for use in a method of manufacture according to the present invention.
Figure 6:
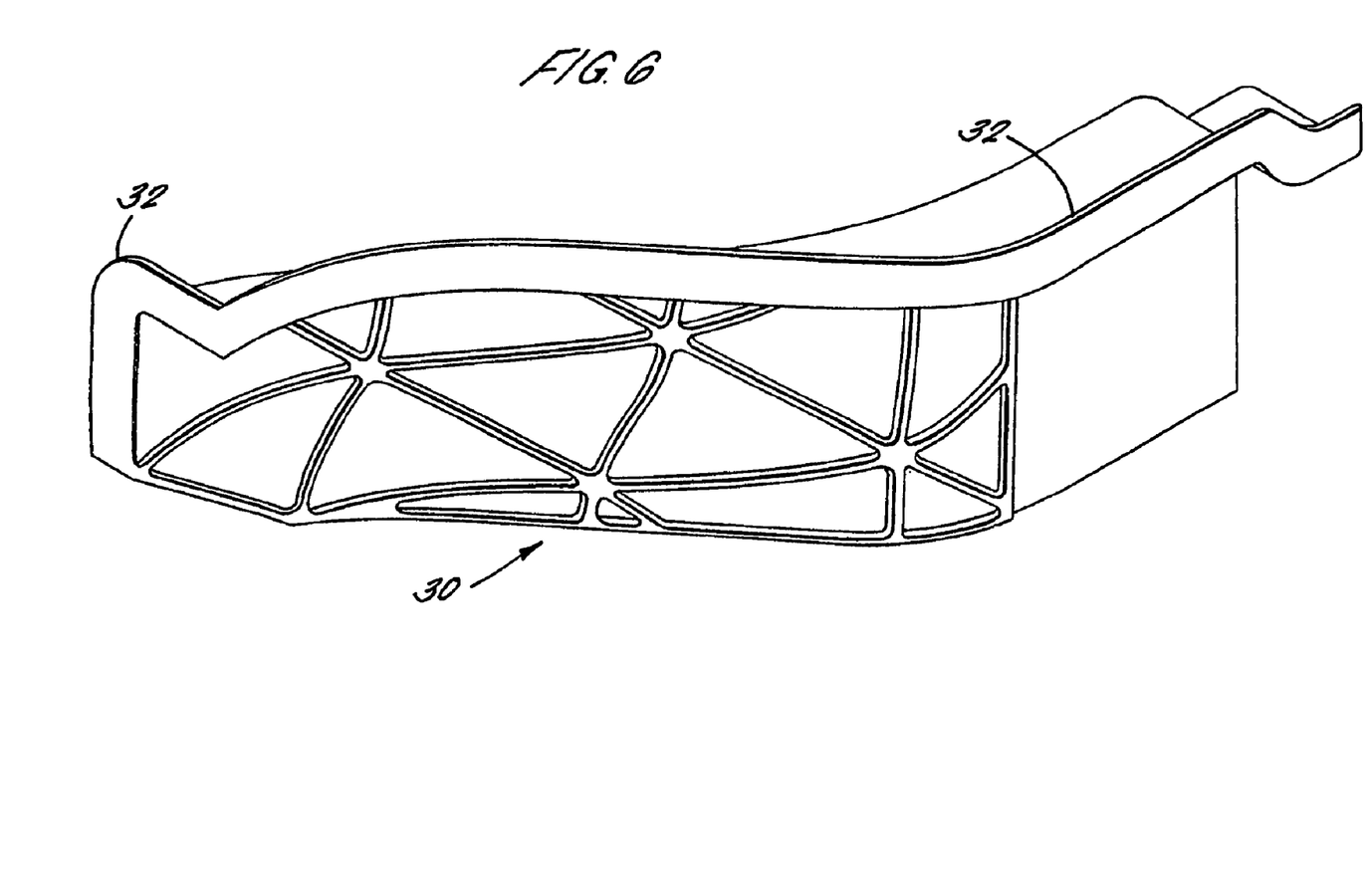
FIG. 6 is a second view of the structural member of FIG. 5.

A second embodiment of casting 30 is shown in FIGS. 5 and 6. The casting 30 is simplified in comparison with the casting 10. It has a socket section 31 open in two perpendicular directions, as an integral feature. The socket section 31 has a flat surface to allow good adhesion of a side rail in the socket section 31. The remainder of the casting 30 has surface ribbing to provide good strength. A flange 32 extends from the upper edge and around the front edge. In FIG. 5 it can be clearly seen that the socket section 31 of the casting 30 immediately after casting has a stepped height feature. A part of the socket section 31 nearest the rearward edge has a first height $h_1$ and then a part inward of the rearward edge has a second greater height $h_2$. This feature is arranged to provide the casting with a degree of flexibility. A designer for a first vehicle may choose to have a side rail with a first sill height $h_1$ while for a second vehicle a larger sill height $h_2$ may be required. A simple cutting operation can convert the open socket 31 from a socket for receiving a sill of height $h_1$ to a socket for a sill of height $h_2$. Thus in a method according to the present invention a single casting is provided with a number of different features, e.g. socket heights which will not all be used in a single automobile structure. Instead a selection can be made.

Figure 7:
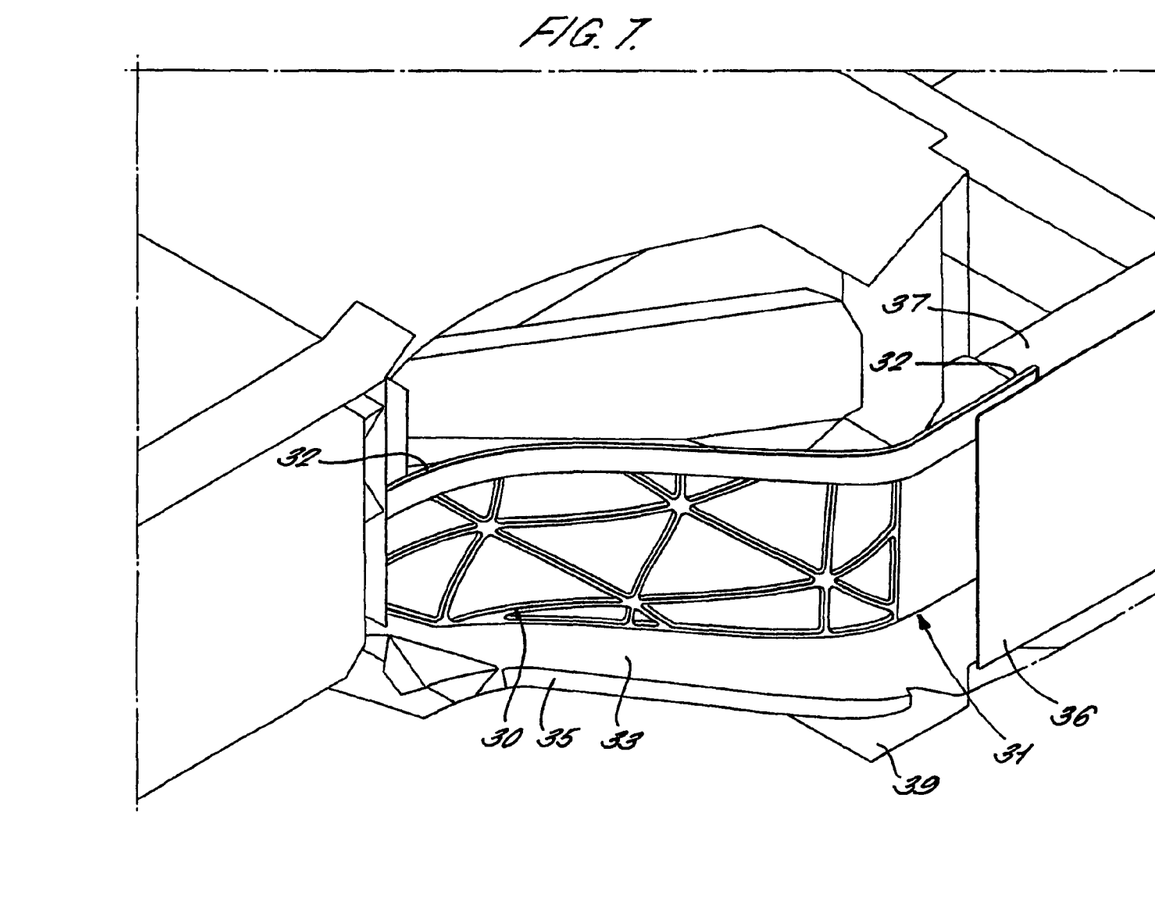
FIG. 7 is a first view of a second assembled joint of an automobile structure manufactured according to the present invention.
Figure 8:
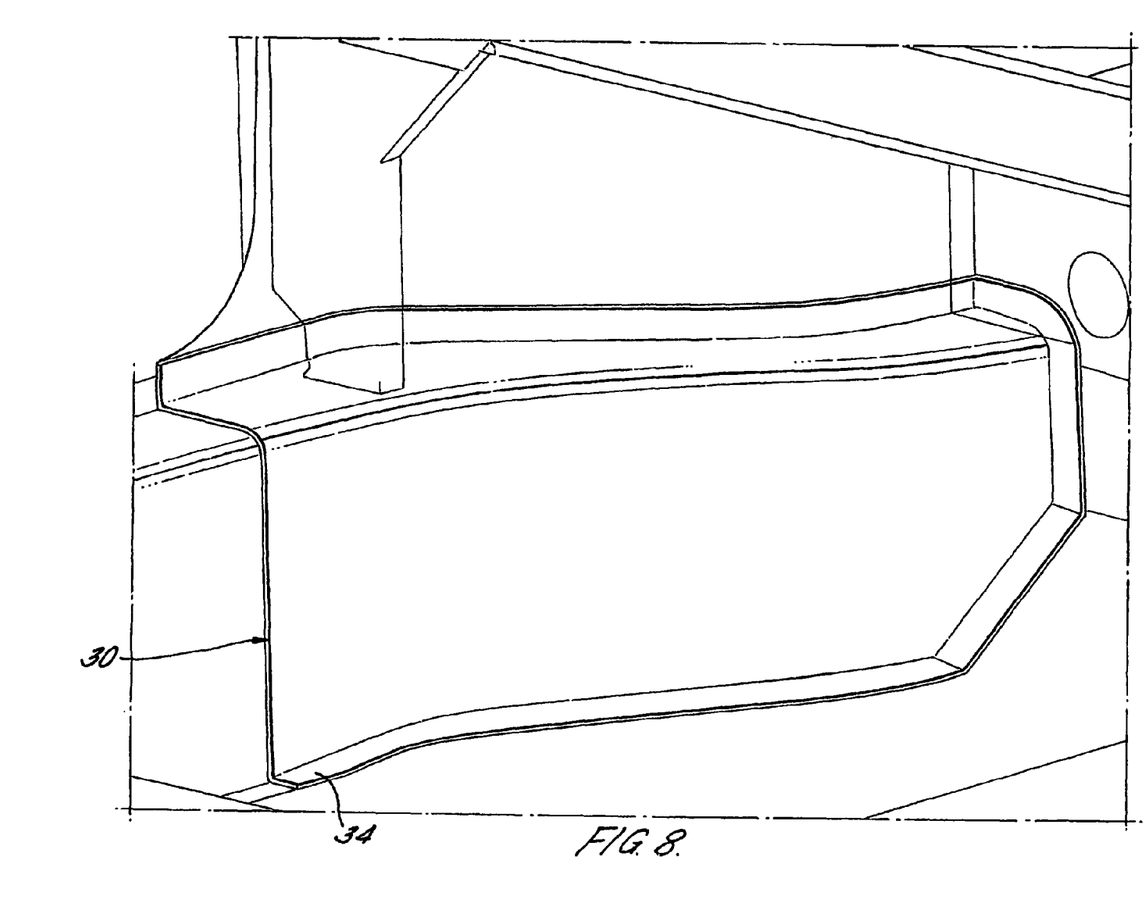
FIG. 8 shows a second view of the assembled joint of FIG. 7.

FIGS. 7 and 8 show the casting 30 in use. First of all it will be seen that the lower height part of the socket section 31 has been removed. A generally L-shaped side rail 37 is adhered in the open socket section 31. A floor section 33 of the automobile structure is adhered to a flange 34 extending from the lower edge of the casting 30 (see FIG. 8). Ghosted in the FIG. 7 is an "A" pillar support structure 39. Forward of the "A" pillar support structure 39 a sheet metal cover plate (not shown) will be adhered to the flange 32 of the casting 30 and to a flanged edge 35 of the floor section 33 (see FIG. 7). Thus, two sides of a box are defined by the casting 30 and two sides by the floor section 33 and the cover plate (not shown) (both made from is sheet metal). A sheet metal plate 36 can be seen adhered to a flanged edge of the floor section 33, to the flange 32 of the casting 30 and to an edge of the L-shaped side rail 37.

Figure 9:
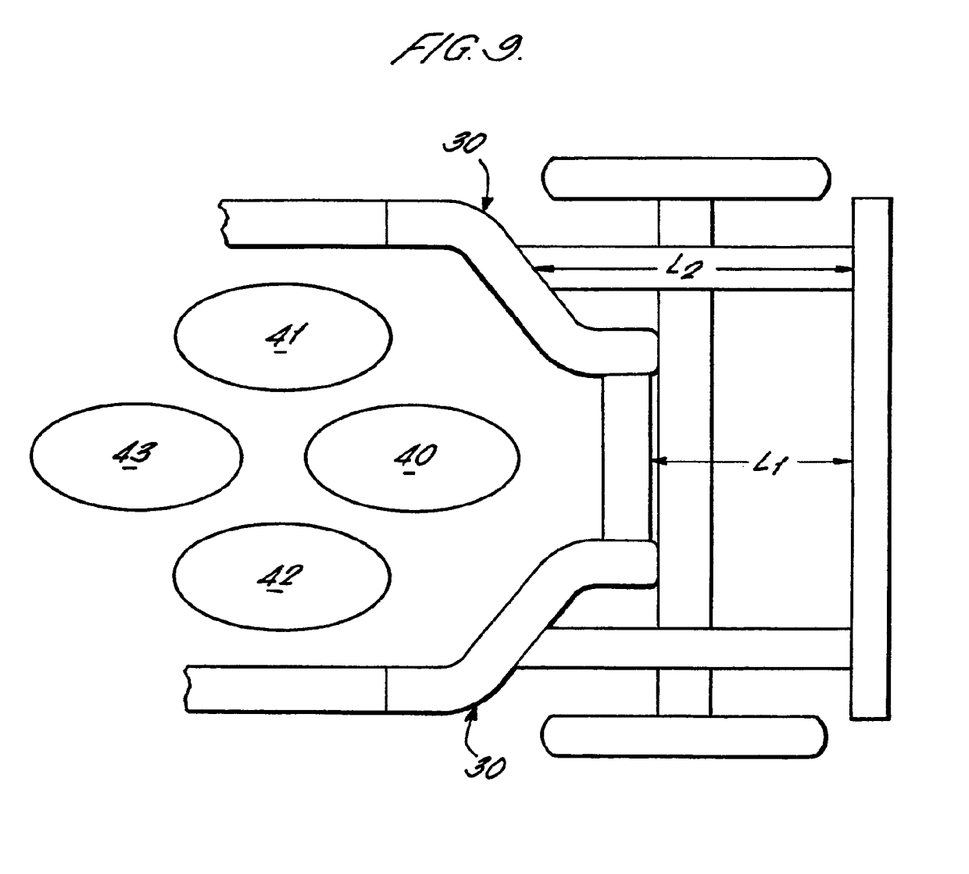
FIG. 9 is a schematic plan view of an automobile structure made by a method according to the present invention which has structural members as shown in FIGS. 5 and 6 and has joints as shown in FIGS. 7 and 8.

The casting 30 is shaped to curve inwardly towards the centre of the vehicle structure. The lateral distance by which the front edge is displaced from the rear edge will be varied from casting to casting. In extremis, the displacement can be such as to give the arrangement shown schematically in FIG. 9. In the figure two castings 30 help to define a floorpan for a 'diamond shaped' seating arrangement in which a driver 40 sits foremost, two passengers 41, 42 sit both laterally and rearwardly displaced from the driver 40 and a third passenger 43 sits immediately behind the driver. This can provide a very efficient use of the overall length of a vehicle. The distance $L_1$ shown in the figure is the distance which must be allowed to provide an adequate crumple zone for a direct frontal impact. For an off-centre impact a longer distance $L_2$ is required. Generally with the conventional driver and passenger side-by-side arrangement the distance $L_2$ must be allowed across the whole of the vehicle (at the front and the rear) and so the length of the vehicle is the sum of $2 \times L_2$ + (room for driver and passenger to sit one behind the other). However, in the new arrangement the length of the vehicle is less because it is the sum of $2 \times L_1$ + (room for driver and passenger to sit one behind the other).

The use of open sockets which are closed by closing plates removes the need for high tolerances which can be achieved only by expensive machining processes. The casting 10 and 30 will typically be of die cast aluminium alloy, perhaps of an alloy with magnesium. The castings 10 and 31 function as parts defining the structure and not just as connecting nodes.

The invention recognises that it is best to use aluminium and alloys thereof for components formed either by casting or by extrusion since pressing of aluminium and aluminium alloys is difficult. Nodes with sockets closed in all but one direction used in previous designs have typically been steel pressings.

It is envisaged that the side rails will be first fixed in place in the open sockets in the castings by mechanical fixings such as EJOT screws or bolts. Then adhesive will be injected into defined gaps (perhaps of depths defined by surface features on the castings and/or the extrusions). The mechanical fixings will be left in place to prevent peeling of the adhesive.

The automobile structure formed by the method described above is a self-supporting structure which provides the primary strength to the automobile and is not simply supply a cladding structure. Bodywork cladding will be joined to and supported by the structure formed by the invention.

The method of the present invention allows great flexibility in design of an automobile structure because the side rails and the transverse rails are formed by cutting sections from long extrusions. The sections can be of any chosen length. The cast nodes are common to all designs. Thus without any additional tooling expenditure the designer can choose long length extrusions for the longitudinal side rails of a four/five passenger vehicle and shorter length extrusions as the side rails of a two-seater vehicle. Similarly transverse rails can be chosen to have different lengths so that the vehicle width can easily be varied. Also, as mentioned above, by designing in each casting the possibility for different size-sockets a large section extrusion can be chosen for a high-silled off-road vehicle while a small section extrusion can be chosen for a low-silled sports car.

Whilst in the above description the side rails are formed as aluminium extrusions, it is possible that the side rails could be formed by pressing and/or folding, particularly if the side rails are formed of steel, which lends itself to pressing and folding operations. When steel is used then spot welding is conveniently used to fix each side rail to a casting.

The invention claimed is:

1. A method of manufacture of an automobile structure comprising the steps of:
    forming in a die a plurality of castings each having at least one socket;
    forming a plurality of metallic rails;
    fixing the metallic rails in the sockets of the castings in order to construct the automobile structure;
    forming at least one of the castings initially with a plurality of differently sized features, each feature capable of defining a plurality of different sizes of sockets;
    selecting a size of cross-section of a metallic rail; and
    machining the said at least one casting to provide the casting with a socket of a size appropriate for the selected metallic rail.

2. A method as claimed in claim 1 wherein:
    four of the castings are formed which in the finished structure are located one each at the four corners of a generally rectangular cabin of the automobile; and
    two of the metallic rails are side rails which extend longitudinally parallel to each other on opposite sides of the cabin each between a different pair of castings, each side rail being fixed at each end in socket of a casting.

3. A method as claimed in claim 2 wherein each of the plurality of metallic rails is formed from an extrusion.

4. A method as claimed in claim 2 which additionally comprises:
    forming at least one of the castings initially with features capable of defining a plurality of different sizes of sockets;
    selecting a size of cross-section of a metallic rail; and
    machining the said at least one casting to provide the casting with a socket of a size appropriate for the selected metallic rail.

5. A method as claimed in claim 4 wherein each of the plurality of metallic rails is formed from an extrusion.

6. A method as claimed in claim 5 comprising fixing the metallic rails in the sockets by bonding with adhesive.

7. A method as claimed in claim 6 wherein the metallic rails are initially secured in place in the sockets by mechanical fasteners and then adhesive is injected in gaps left between the rails and the sockets.

8. A method as claimed in claim 6, comprising:
    forming in at least one of the castings a socket having a pair of parallel spaced apart planar surfaces extending between side walls common to both;
    forming a rectangular cross-section hollow metal rail;
    cutting away three of the four walls from an end section of the hollow metal rail to leave exposed a planar surface which was originally an interior surface of the hollow metal rail; and
    adhering the exposed planar surface of the metal rail to one of the parallel spaced apart planar surfaces of the casting and adhering to the other planar surface of the casting a part of an exterior surface of the hollow rail which is parallel to and spaced apart from the exposed planar surface of the hollow rail.

9. A method as claimed in claim 4, wherein each socket formed in each casting is open in two perpendicular directions.

10. A method as claimed in claim 9 wherein a closing plate is used to complete each socket.

11. A method as claimed in claim 2 wherein each metallic rail is formed from steel by pressing and/or folding.

12. A method as claimed in claim 11 comprising fixing the metallic rails in the sockets by welding.

13. A method as claimed in claim 11 wherein each socket formed in each casting is open in two perpendicular directions.

14. A method as claimed in claim 13 wherein a closing plate is welded to each casting to complete each socket.

15. A method as claimed in claim 14, comprising:
forming in at least one of the castings a socket having a pair of parallel spaced apart planar surfaces extending between side walls common to both;
forming a rectangular cross-section hollow metal rail;
cutting away three of the four walls from an end section of the hollow metal rail to leave exposed a planar surface which was originally an interior surface of the hollow metal rail; and
welding the exposed planar surface of the metal rail to one of the parallel spaced apart planar surfaces of the casting and welding to the other planar surface of the casting a part of an exterior surface of the hollow rail which is parallel to and spaced apart from the exposed planar surface of the hollow rail.

16. A method as claimed in claim 2 wherein at least one metallic rail is formed as an L-shaped rail and in the method a cover plate is fixed to the L-shaped metallic rail to close the L.

17. A method as claimed in claim 16 wherein the L-shaped rail is fixed additionally to a floor panel and the cover plate is fixed to both the floor panel and the metallic rail in order to form a closed-section structure extending along a side of the vehicle.

18. A method as claimed in claim 1 comprising fixing the metallic rails in the sockets by bonding with adhesive.

19. A method as claimed in claim 18 wherein the metallic rails are initially secured in place in the sockets by mechanical fasteners and then adhesive is injected in gaps left between the rails and the sockets.

20. A method as claimed in claim 18, comprising:
forming in at least one of the castings a socket having a pair of parallel spaced apart planar surfaces extending between side walls common to both;
forming a rectangular cross-section hollow metal rail;
cutting away three of the four walls from an end section of the hollow metal rail to leave exposed a planar surface which was originally an interior surface of the hollow metal rail; and
adhering the exposed planar surface of the metal rail to one of the parallel spaced apart planar surfaces of the casting and adhering to the other planar surface of the casting a part of an exterior surface of the hollow rail which is parallel to and spaced apart from the exposed planar surface of the hollow rail.

21. A method as claimed in claim 1, wherein each socket formed in each casting is open in two perpendicular directions.

22. A method as claimed in claim 21 wherein a closing plate is used to complete each socket.

23. A method as claimed in claim 1 wherein each metallic rail is formed from steel by pressing and/or folding.

24. A method as claimed in claim 23 comprising fixing the metallic rails in the sockets by welding.

25. A method as claimed in claim 24, comprising:
forming in at least one of the castings a socket having a pair of parallel spaced apart planar surfaces extending between side walls common to both;
forming a rectangular cross-section hollow metal rail;
cutting away three of the four walls from an end section of the hollow metal rail to leave exposed a planar surface which was originally an interior surface of the hollow metal rail; and
welding the exposed planar surface of the metal rail to one of the parallel spaced apart planar surfaces of the casting and welding to the other planar surface of the casting a part of an exterior surface of the hollow rail which is parallel to and spaced apart from the exposed planar surface of the hollow rail.

26. A method as claimed in claim 23 wherein each socket formed in each casting is open in two perpendicular directions.

27. A method as claimed in claim 26 wherein a closing plate is welded to each casting to complete each socket.

28. A method as claimed in claim 1 wherein at least one metallic rail is formed as an L-shaped rail and in the method a cover plate is fixed to the L-shaped metallic rail to close the section.

29. A method as claimed in claim 28 wherein the L-shaped rail is fixed additionally to a floor panel and the cover plate is fixed to both the floor panel and the metallic rail in order to form a closed-section structure extending along a side of the vehicle.

* * * * *